June 11, 1963 P. SCRIBENS 3,093,215
ROTATABLE BASE ASSEMBLY
Filed Nov. 22, 1961
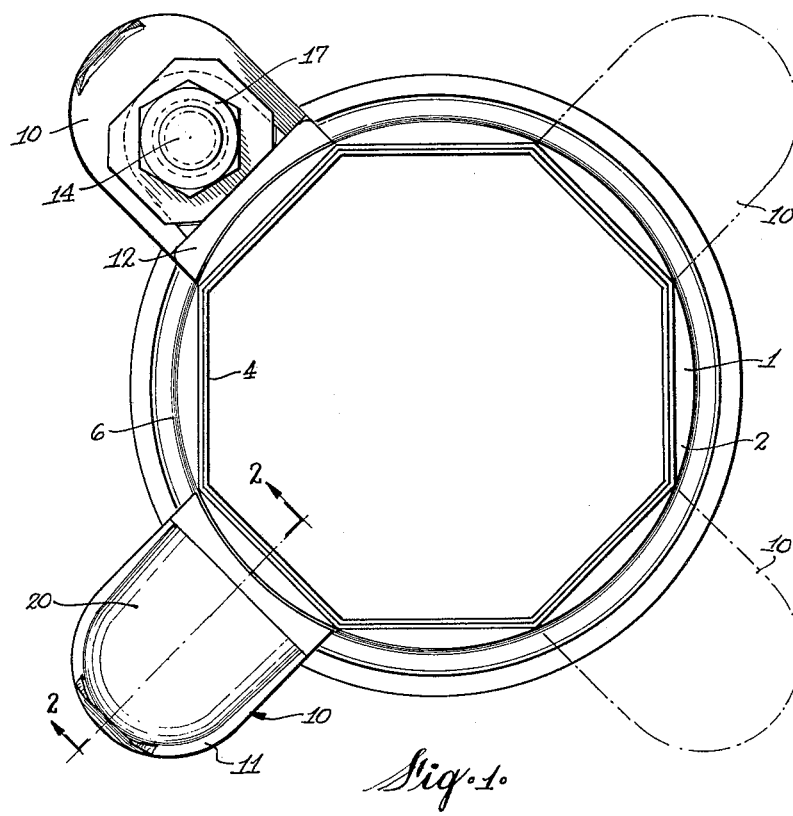
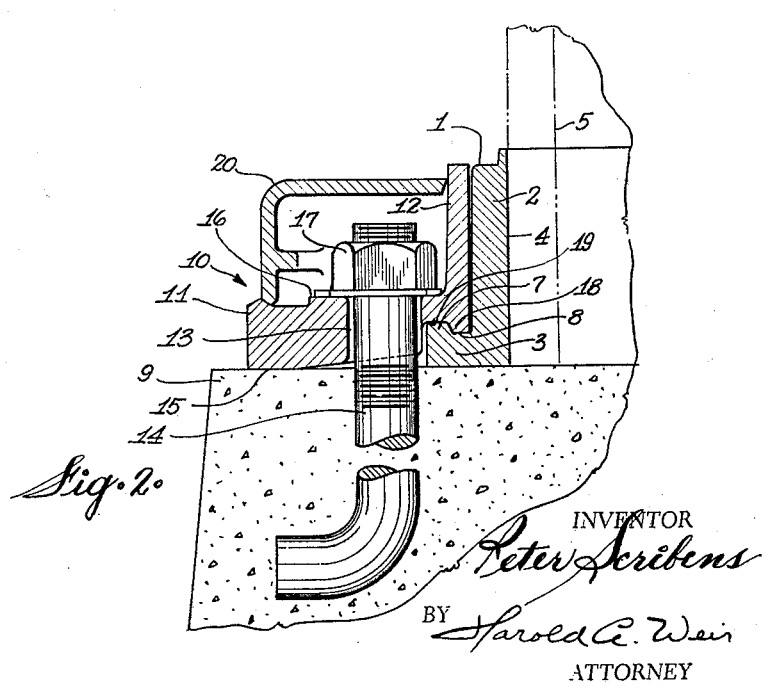
INVENTOR
Peter Scribens
BY Harold C. Weir
ATTORNEY

3,093,215
ROTATABLE BASE ASSEMBLY
Peter Scribens, Calgary, Alberta, Canada, assignor to Barber Machinery Limited, Calgary, Alberta, Canada
Filed Nov. 22, 1961, Ser. No. 154,216
2 Claims. (Cl. 189—29)

This invention relates to a rotatable base assembly. One of the problems associated with the erection of some types of poles or standards is the proper positioning of the pole or standard to face in a desired direction. This problem assumes special significance in the erection of lighting standards where it is desired to focus, or otherwise direct, light from a fixed base in a certain direction onto one object or a number of objects. On the conventional pole or standard the attaching brackets are in fixed position with respect to the anchor bolts, and thus the pole or standard can be moved in certain directions only, usually by increments of 90°. This, in lighting applications for service stations, supermarkets, driveways, building fronts, etc., is generally unsatisfactory.

It is an object of this invention to provide a base assembly for supporting poles, standards and the like, which is of simple design, which may be easily and economically manufactured and installed, which constitutes an effective and satisfactory supporting means for a pole, standard, or the like, and which permits the selective rotative positioning and adjustment of such pole or standard.

These and other objects of this invention are provided by a rotatable base assembly comprising a socket member having an annular wall and a flange extending radially outwardly from one end of said wall, said flange having an annular peripheral rib thereon in opposed relation to said wall and an annular groove constituted by surfaces of said rib and wall, and a plurality of mounting brackets each comprising an anchor bolt receiving base plate having a base engageable surface, a surface in substantially perpendicular relation to said base engageable surface and engageable with said annular wall, an arcuate rib depending from said annular wall engageable surface and receivable in said groove, and an arcuate recess adjoining said rib and arranged to receive said peripheral rib.

These and other features of the invention will be described with reference to the accompanying drawings, in which—

FIGURE 1 is a plan view of an embodiment of the invention and

FIGURE 2 is a side sectional view on line 2—2 of FIGURE 1.

In the drawing, there is shown a socket member 1 having an annular wall 2 and a flange 3 extending radially outwardly from one end of said wall. Wall 2 has an inner surface 4 which, as shown, is of octagonal contour but which may be of a contour complementary to that of the lower end of a pole or standard, such as indicated at 5, for snug supporting reception of such pole or standard. The outer surface 6 of wall 2 is preferably of circular configuration as shown.

Flange 3 has a peripheral annular rib 7 in opposed relation to wall 2 and forming therebetween an annular groove 8.

Means for mounting the socket member 1 on a rigid base 9 comprises a plurality of clamping brackets 10 each having a base plate 11 and an upright lug 12 thereon. Base plate 11 has a hole 13 therein to receive the end of an anchor bolt 14 anchored in base 9. Base plate 11 also has a bottom base engageable surface 15, a top surface 16 on which is arranged to be mounted an anchor bolt securing nut 17, an arcuate rib 18 depending from lug 12 and disposed between surfaces 15 and 16, and an adjoining arcuate groove 19 formed by said rib.

In use, the socket member 1 is positioned on the base 9 between the anchor bolt ends and the clamping brackets applied thereto with the ribs and grooves 18 and 19 seated on the rib 7 and groove 8 as shown in FIGURE 2. It will be observed that the ribs 18 and grooves 19 are in snug interfitting relationship with rib 7 and groove 8. The lower end of the post or standard 5 is then seated in the socket of the socket member and rotated to desired position. It will be apparent that, with the clamping brackets in loosened condition, the socket member and standard are free to rotate. Nuts 17 are then tightened in place to secure the socket member and standard in selected position. Adjustment of the rotative position of the standard is readily effected at any time by loosening the nuts 17 and the brackets.

The bottom surfaces 15 of the brackets may be slightly inclined upwardly from the outer edges thereof, as shown, for more effective clamping engagement.

A nut cover 20 may be applied to each clamping bracket 10.

I claim:

1. A rotatable base assembly comprising a socket member having an annular wall and flange extending radially outwardly from one end of said wall, said flange having an annular peripheral rib thereon in opposed relation to said wall and an annular groove constituted by surfaces of said rib and wall, and a plurality of mounting brackets each comprising an anchor bolt receiving base plate having a base engageable surface, a surface in substantially perpendicular relation to said base engageable surface and engageable with said annular wall, an arcuate rib depending from said annular wall engageable surface and receivable in said groove, and an arcuate recess adjoining said rib and arranged to receive said peripheral rib.

2. A rotatable base assembly as defined in claim 1, said wall having a circular outer surface and each said wall engageable surface of said brackets being arcuate for engagement with said circular outer surface.

References Cited in the file of this patent
UNITED STATES PATENTS

| | | |
|---|---|---|
| 1,691,720 | Jimerson | Nov. 13, 1928 |
| 1,857,489 | Weitz | May 10, 1932 |
| 2,395,326 | Handley et al. | Feb. 19, 1946 |
| 3,031,041 | Pfaff | Apr. 24, 1962 |

FOREIGN PATENTS

| | | |
|---|---|---|
| 1,232,031 | France | Apr. 19, 1960 |
| 957,408 | Germany | Jan. 31, 1957 |